Fig. 1.

INVENTOR.
Richard W. Treharne Jr.
BY
HIS ATTORNEY

Fig. 2.

INVENTOR.
Richard W. Treharne Jr.

Fig. 3.

Patented Mar. 23, 1954

2,673,292

UNITED STATES PATENT OFFICE 2,673,292

VEHICLE REPORTING SYSTEM

Richard W. Treharne, Jr., Pittsburgh, Pa., assignor to Westinghouse Air Brake Company, a corporation of Pennsylvania Application July 16, 1949, Serial No. 105,144

15 Claims. (Cl. 246—124)

My invention relates to vehicle reporting systems, and more particularly to systems for indicating the destination, origin and class of vehicles moving along a route.

In many places passenger vehicles scheduled for different destinations use the same route for a portion of their routes and each may stop at stations along this common route to discharge and take on passengers. Confusion and uncertainty are avoided if at each of these stations the destination and class of each vehicle is announced or indicated at the station prior to the arrival of the vehicle. Also, on subways and similar railways where the trains are operated closely following each other, delays may occur at junction points and at interlockings because the wayside operator whose duty it is to arrange the track switches at such locations must wait to make sure of the destination of an approaching train before he lines up the route.

Furthermore, there are places where operation is improved if a train can set into action means which will automatically establish the route for the train as it approaches a junction point.

Accordingly, an object of my invention is the provision of improved vehicle reporting apparatus to indicate at a station the destination or class of a vehicle approaching the station.

Another object of my invention is the provision of vehicle reporting systems incorporating novel means capable of responding differently for each of a plurality of different control influences transferred between a vehicle-carried element and a wayside element.

Still another object of my invention is the provision of vehicle reporting apparatus of the type here involved incorporating novel means for transmitting signaling influences between a vehicle-carried coil tuned to resonance at a frequency selected according to the destination or class of the vehicle and a corresponding one of a plurality of wayside circuits tuned each to resonance at the frequency corresponding to the frequency of an individual one of the different destinations or vehicle classes. As an alternative arrangement the vehicle destination may be identified by a code group of two or more vehicle coils and a corresponding code group in the tuned wayside circuits used.

A further object of my invention is the provision of vehicle reporting apparatus of the type here involved incorporating means for distinguishing between the signaling influence of the vehicle-carried coil on the wayside apparatus, and the influence of metal bodies, such as the sides of the vehicle, on the wayside apparatus, so that the wayside apparatus responds with a much higher degree of selectivity to the influence of the vehicle-carried coil.

The advantage of this arrangement is that it enables the coupling between the vehicle-carried coil and the wayside coil to be materially reduced, either by increasing the maximum distance between them or by reducing their dimensions or both.

Other features, objects and advantages of my invention will appear as the specification progresses.

This is a continuation-in-part of my prior application, Serial No. 90,719, filed on April 30, 1949, now abandoned for improvements in train describer systems.

To attain the foregoing objects, features and advantages of my invention I provide at a reporting point or a station along a route over which vehicles operate a non-tuned alternating current bridge circuit network. One arm of the bridge consists of a receiving element in the form of a coil located along the route in such manner as to be influenced by other elements carried by the vehicles operated over the route. A plurality of oscillators in multiple are connected across the input terminals of the bridge, each oscillator supplying energy of a frequency individual to the oscillator. Thus the oscillators supply energy to the bridge which includes a plurality of different frequency components. As an alternative to providing a plurality of different oscillators, I may provide a single oscillator to supply energy having a wave form which is made up of a plurality of different frequency components. The number of oscillators provided is such that there is a selected oscillator or a selected group of oscillators for each destination or class of vehicle operating over this route. In other words, the energy supplied to the bridge has a selected frequency component for each vehicle destination or class, or a selected group of frequency components for each vehicle destination or class.

The bridge is constructed and arranged so that the product of the impedances of one pair of diagonally opposite arms normally is equal to the product of the impedances of the other pair of diagonally opposite arms, for each of the frequencies which are employed. As a result, the bridge is normally balanced with respect to all of these frequencies. The elements employed in the bridge are substantially linear with respect to the frequencies employed, so that when the frequencies are applied simultaneously the effect is the same as when each frequency is supplied separately, in accordance with the well-known theorem of superposition. Accordingly, a plurality of frequencies may be applied to the input terminals of the bridge, and the bridge may be so balanced that the voltage across the output terminals will be substantially zero with respect to each of the frequencies. If the impedance of one of the arms is changed, with respect to a particular frequency, a voltage of that frequency will appear at the output terminals which is proportional to the amount of unbalance.

That is to say, the bridge is normally balanced for each frequency component of the wave of the energy supplied to the bridge and a voltage appears at the output terminals of the bridge whenever the wayside coil which is in one arm of the bridge is influenced in any manner that would tend to vary its normal impedance characteristic, with respect to one or more of the frequencies supplied to the bridge.

I also provide at this reporting point a plurality of tuned circuits coupled to the output terminals of the bridge, one for each frequency component of the energy supplied to the bridge. Each tuned circuit preferably includes an amplifier, a controlled ionization or gas tube and a relay interposed in the anode circuit of the tube. The arrangement is such that each tube is non-conductive as long as no voltage is supplied to the input of the amplifier of the same tuned circuit. When a voltage of the correct frequency is supplied to a tuned circuit, the respective tube is fired and the corresponding relay is energized by the conduction current of the tube. Consequently, the relays associated with the tuned circuits are selectively energized singly or in groups according to the frequencies of the voltages created at the output terminals of the bridge and in turn supplied to the inputs of the several tuned circuits.

Each vehicle is equipped with at least one coil tuned to resonance at a frequency corresponding to the destination or class of the vehicle. As an alternative arrangement, each vehicle may be equipped with a group of coils and each destination or class identified by a selected combination of two or more frequencies. The passage of a tuned vehicle coil near the wayside coil causes the impedance of the wayside coil to vary from its normal value in such manner that the bridge is unbalanced for the frequency for which the vehicle coil is tuned and to remain balanced for the remaining frequencies. This action causes a voltage having the frequency at which the vehicle coil is tuned to appear at the output terminals of the bridge and the gas tube of the corresponding tuned wayside circuit is fired to energize the respective relay. These relays are used in turn to control line circuits which may govern the routing of the vehicle in accordance with its destination or may govern destination indicating devices at a wayside station. I provide manual or automatic means for subsequently deionizing the gas tube that has been fired due to a vehicle coil passing the wayside coil. When each destination is identified by a code combination of frequencies, then the destination indicators would be selectively controlled by a corresponding group of the relays of the tuned wayside circuits.

It has been found that the arrangements described above comprising my invention, when adjusted to a high degree of sensitivity to permit operation with a comparatively large space between the coil on the vehicle and the wayside coil, may be erroneously operated by the passage of large metallic bodies near the wayside coil, such as the metal sides or floor of a passing vehicle. This action is the result of eddy currents induced in the metal by the current flowing in the wayside coil. The load thus placed on the wayside coil is such that the impedance of the wayside coil is decreased, whereas, the load placed on the wayside coil by the proximity of a tuned coil is such that the impedance of the wayside coil is increased. In each case, the bridge is unbalanced, but the phase of the voltage appearing across the output terminals of the bridge when the bridge is unbalanced by the tuned coil is different from the phase of the voltage produced by the unbalancing of the bridge by a large metal object. In a modification of my invention, I provide means for comparing the phase of the output voltage of the bridge with the input voltage to detect the value and direction of the phase shift between the output and input voltages. If the phase shift is such that it shows the unbalance has been produced by a metal object influencing the wayside coil, the gas tube previously described is prevented from firing and the relay controlled thereby remains released, but if the phase shift is such that the unbalance voltage is the result of a tuned coil influencing the wayside coil, the gas tube is fired and the relay operates to indicate the passage of vehicle carrying the tuned coil.

I shall describe three forms of vehicle reporting apparatus embodying my invention and shall then point out the novel features thereof in claims.

In the accompanying drawings.

It is to be understood that my invention is not limited to its use in systems for indicating the destination of railway trains but it may also be applied to highway vehicles such as busses. This one application of the apparatus serves as an illustration of the principles of the invention and other applications of the apparatus will suggest themselves to those skilled in the art.

Figure 1:
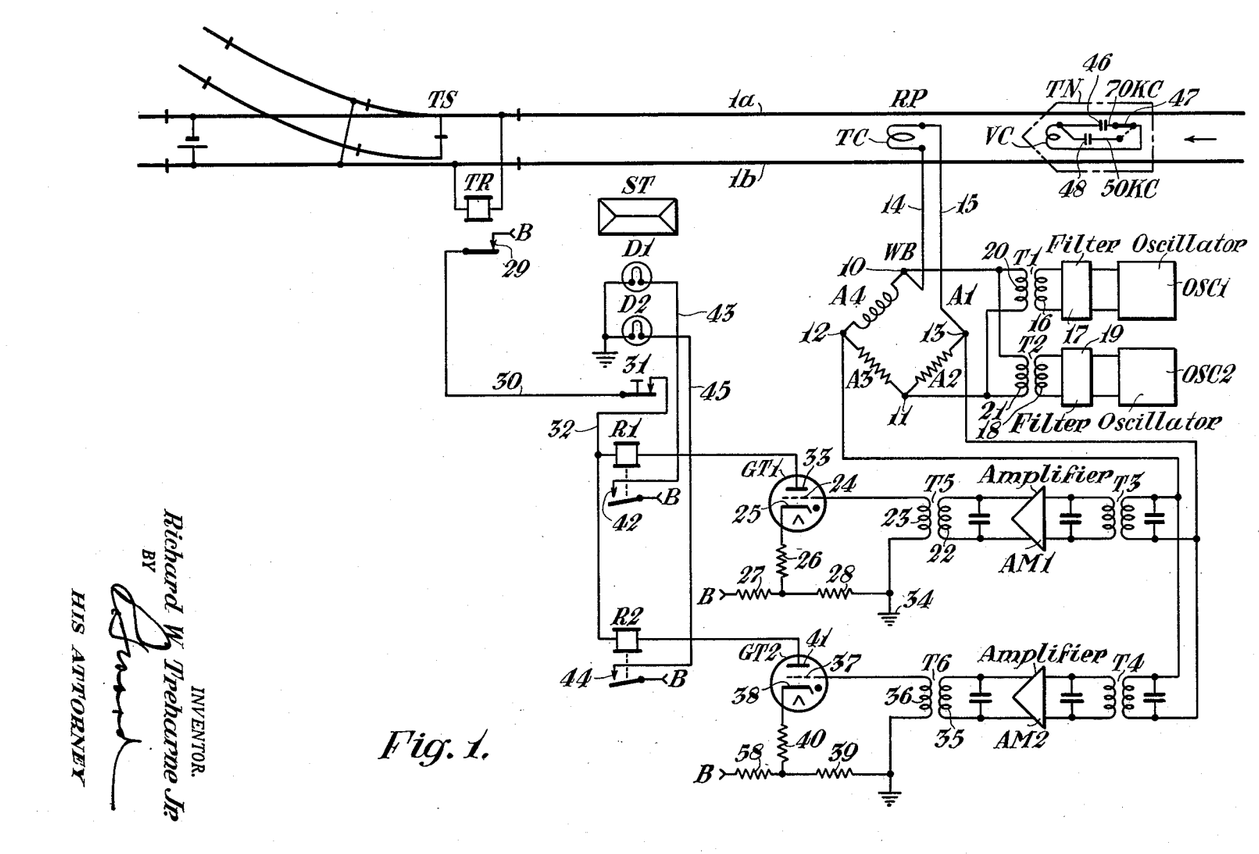
Figs. 1 and 2 are diagrammatic views showing a first and a second form, respectively, of vehicle reporting apparatus embodying my invention when used to indicate the destination of railway trains.
Figure 2:
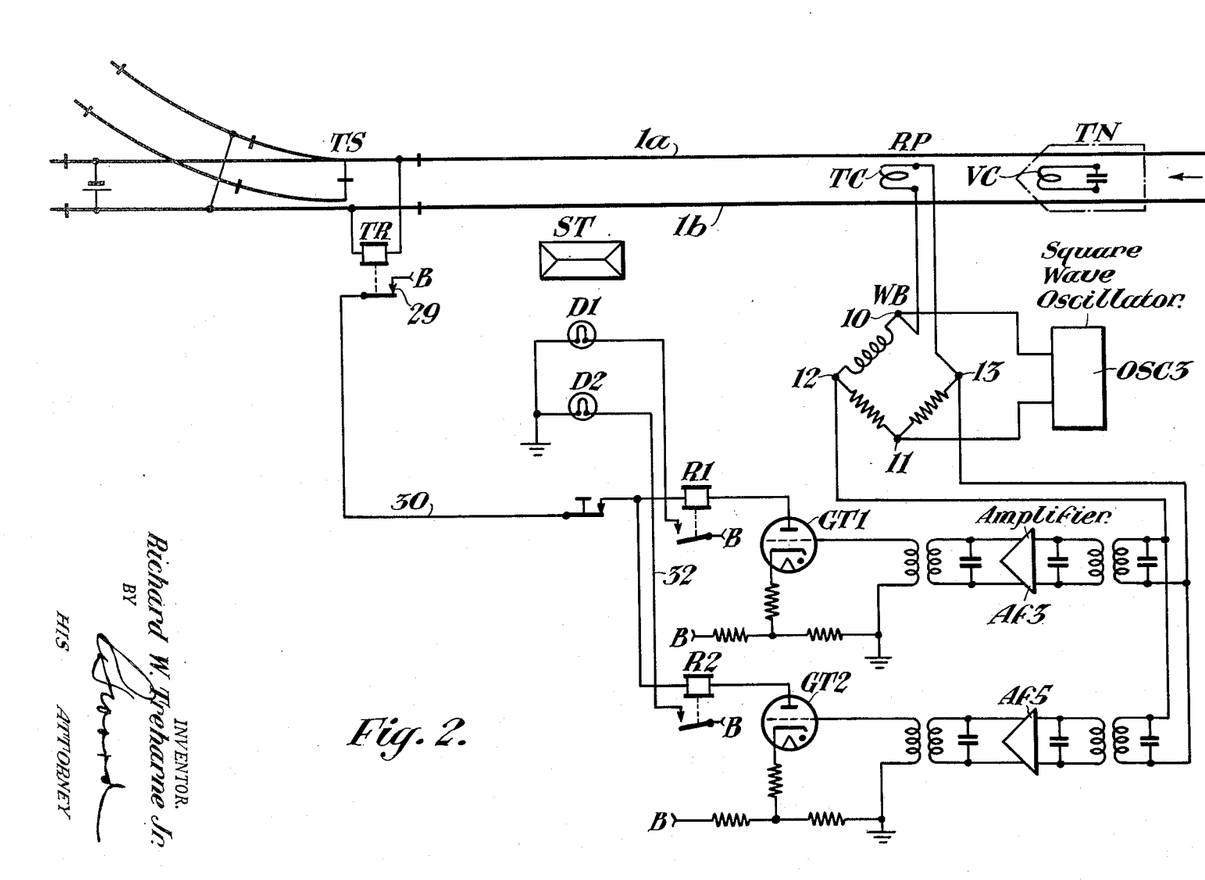
Figure 3:
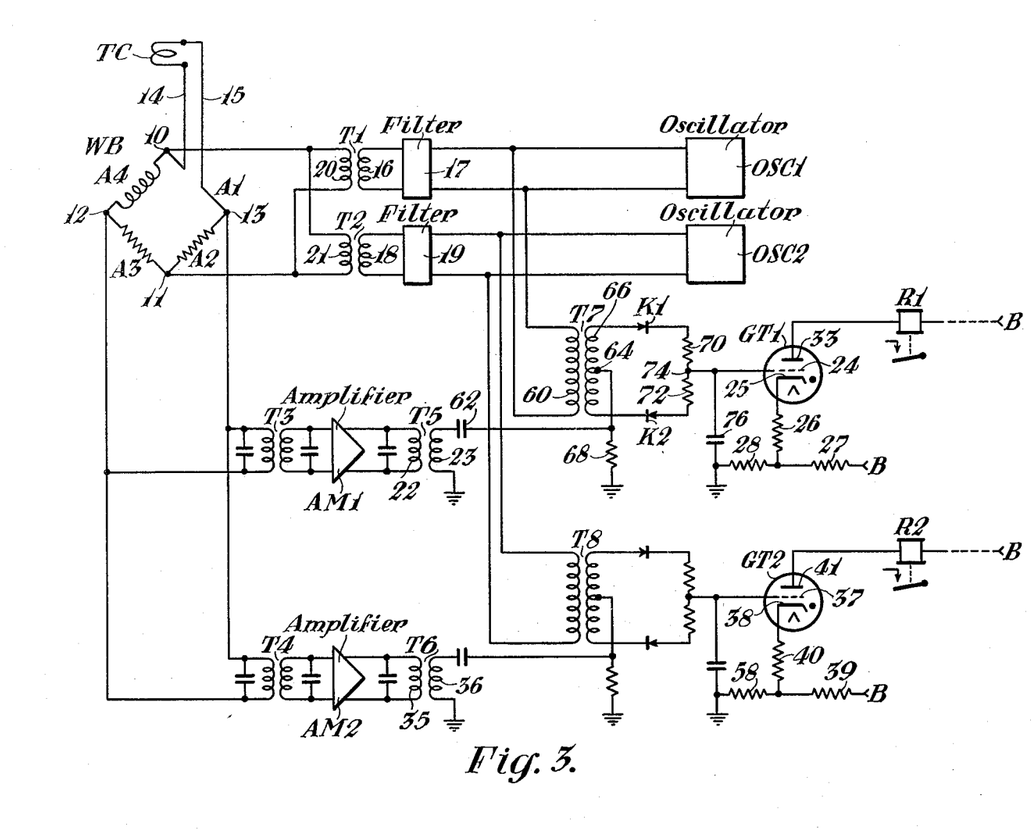
Fig. 3 is a fragmentary diagrammatic view of a modification of the arrangement shown in Fig. 1.

In each of the three views like reference characters are used to indicate like elements.

Referring to Fig. 1, the reference characters 1a and 1b designate the track rails of a given stretch of railway over which trains such as the one designated TN in the drawing normally operate in the direction from right to left as indicated by an arrow. The trains operating over this stretch of railway stop at a station ST to discharge and take on passengers, the train then proceeding to the left as viewed in Fig. 1 to either a first destination when a track switch TS is in its normal position, as shown in Fig. 1, or to a second destination when the track switch TS is in its reverse position.

The track switch TS may be hand-operated or it may be operated by a power switch machine which is either controlled manually by an operator located at some remote point, or automatically in accordance with the destination indicated by the apparatus of my invention. The apparatus for operating the track switch TS is not shown since this forms no part of my present invention.

A reporting point RP is established along the railway at a selected point in approach to the wayside station ST, at which the trackway apparatus of the train reporting system embodying my invention is located, the distance between the station ST and the reporting point RP being determined according to the nature of the track and the speed at which the trains travel this stretch of railway. This trackway apparatus comprises as essential elements a receiving element in the form of a wayside coil TC, a bridge WB, at least two oscillators OSC1 and OSC2 and at least two tuned circuits each of which includes an amplifier, a controlled ionization type of tube and a relay. This apparatus also includes suitable sources of power.

The wayside coil TC is preferably an air core coil consisting of one or more turns of wires as may be selected. The coil is made of a suitable size and it is preferably housed in a case to protect the coil against injury but which case does not affect its electrical characteristics. The coil TC may be mounted either between the rails of the track as shown in Fig. 1 or beside the track. It is mounted to be relatively close to train-carried elements to be described hereinafter but to be outside of the prescribed clearance line which defines the maximum space occupied by the vehicles.

The bridge WB is of conventional construction consisting of two parallel circuit paths each of which includes two arms. As here shown the arms A1 and A2 constitute one path and the arms A3 and A4 constitute a second path. The junctions of the two parallel paths of the bridge constitute the input terminals 10 and 11 of the bridge, and the junctions of the two arms of each path constitute the output terminals 12 and 13 of the bridge.

It is to be understood, however, that the input and output terminals may be interchanged, without affecting the operation of the bridge. That is, the input terminals may be terminals 12 and 13 and the output terminals may be 10 and 11, instead of as shown. The bridge may be located in a suitable instrument case along the trackway. The arm A1 consists of the wayside coil TC and lead wires 14 and 15 extending between the track coil and the instrument case. The arm A4 consists of an air core coil selected as to its size and construction to have an impedance preferably to match the impedance of the wayside or track coil TC with its lead wires. The arms A2 and A3 are preferably resistors, but other forms of impedances can be used, with the limitation that the impedance ratio of A1 to A4 should equal that of A2 to A3.

In other words, the elements in the bridge arms are selected and arranged so that the product of the impedances of one pair of opposite arms is equal to the product of the impedances of the other pair of opposite arms, at the frequencies employed, and as a result, the bridge is balanced and the output voltage is substantially zero. For example, with the bridge constructed as shown in Fig. 1, the product of the impedances of the track coil TC and the lead wires 14 and 15, and the impedance of the resistor in arm A3, is equal to the product of the impedances of arm A4 and arm A2. The coils are of the air-core type. The impedance of the coils will vary directly with the frequency. The ratios between the arms of the bridge will remain constant as the impedances of the individual elements vary due to changes in frequency, so that the bridge remains balanced at any particular frequency in the range of frequencies employed.

From the foregoing, it will be seen that the voltage across the output terminals is normally zero, and an unbalance of the bridge for any particular frequency causes an unbalance voltage of that frequency to appear across the output terminals of the bridge, while voltages of the other frequencies are zero or negligible. Thus, with the bridge constructed and characterized in the manner described above, it is possible to unbalance the bridge with respect to a selected one of a plurality of frequencies impressed on the input terminals of the bridge and yet not disturb its balance with respect to the remaining frequencies.

The oscillators OSC1 and OSC2 of the wayside apparatus at the reporting point RP are shown conventionally since they may be any one of several well-known forms. Preferably these oscillators are of an electron tube type, each supplying a preselected individual frequency. Preferably the oscillators are arranged to supply oscillations having a relatively high order of frequency stability and of a substantially sinusoidal wave form. The frequencies of the oscillators may be selected from a relatively wide range of frequencies and I have found that frequencies in the range from one kilocycle to one megacycle are satisfactory, and by way of example, the frequencies of the oscillators OSC1 and OSC2 will be assumed as being 70 kc. and 50 kc., respectively.

The output of the oscillator OSC1 is connected to a primary winding 16 of a transformer T1 through a filter 17 which filter is tuned to effectively pass only the frequency of the corresponding oscillator. That is, the filter 17 is constructed to pass only the frequency of 70 kc. here assumed for the oscillator OSC1. Similarly, the output of the oscillator OSC2 is connected to primary winding 18 of a transformer T2 through a filter 19 which is tuned to pass only the frequency of 50 kc. assumed for the oscillator OSC2. Secondary windings 20 and 21 of the transformers T1 and T2, respectively, are connected in multiple across the input terminals 10 and 11 of the bridge WB. It follows that these two frequencies, 70 kc. of oscillator OSC1 and 50 kc. of oscillator OSC2, are simultaneously impressed upon the bridge WB but since the bridge is balanced for both frequencies, a zero or null voltage appears across the output terminals 12 and 13 of the bridge.

The filters 17 and 19 are provided to prevent feed back from one oscillator to the other. However, I have found that by proper construction of the oscillators a satisfactory performance can be obtained without the use of the filters in which case these filters 17 and 19 may not be needed and they may be omitted from the apparatus.

A first one of the tuned circuits provided at the wayside reporting point RP includes an amplifier AM1, a gas tube GT1 and a relay R1. Similarly, a second one of the tuned circuits includes an amplifier AM2, a gas tube GT2 and a relay R2. The two amplifiers AM1 and AM2 are shown in a conventional manner since they may be of any standard arrangement for electron tube amplifiers. The input circuits of the two amplifiers AM1 and AM2 are connected in multiple across the output terminals 12 and 13 of the bridge through coupling transformers T3 and T4, respectively, as will be apparent by an inspection of the drawing. These input circuits of the amplifiers are tuned to resonance at the frequency of 70 kc. and 50 kc., respectively, this tuning being effected by capacitors connected across the primary and secondary windings of the coupling transformers T3 and T4.

The output of the amplifier AM1 includes a tuned primary winding 22 of a transformer T5, a secondary winding 23 of which transformer is connected across the control grid 24 and a cathode 25 of the gas tube GT1, a source of bias voltage and a resistor being included in the circuit. This bias voltage source for the tube GT1 may take different forms and in Fig. 1 it is shown as a potentiometer comprising two resistors 27 and 28 connected in series across a power source, the positive terminal of which is designated by the reference character B and the negative terminal of which source is grounded, as indicated by a ground electrode 34, for example. The cathode 25 of the tube GT1 is connected through resistor 26 to the junction terminal of resistors 27 and 28 and the low potential end of the resistor 28 is connected to a junction terminal of secondary winding 23 and ground electrode 34. The other terminal of winding 23 is connected to the control grid 24. Consequently the cathode 25 of tube GT1 is positive in potential with respect to grid 24 by a voltage equal to the voltage drop across the resistor 28.

The tube GT1 is provided with an anode circuit which can be traced from positive terminal B of the power source through front contact 9 of a track relay TR, to be referred to later, line wire 30, a normally closed manually operable push button 31, line wire 32, winding of relay R1, anode 33 and tube space to cathode 25 of tube GT1, and resistors 26 and 28 to the negative terminal of the power source at the ground electrode 34. The parts are so proportioned that the voltage applied across the anode 33 and cathode 25 of the tube GT1 is ineffective to fire the tube due to the normal negative bias provided for the grid 24. However, the positive half cycles of the alternating voltage created at a secondary winding 23 of transformer T5 when an alternating voltage of 70 kc. of sufficient magnitude is supplied to the input of the amplifier AM1, drives the grid 24 in the positive direction so that the tube GT1 is fired causing the relay R1 to be energized and picked up due to the conduction current of the tube.

Similarly, the output of the amplifier AM2 is connected to a tuned primary winding 35 of a transformer T6, a secondary winding 36 of which is connected across control grid 37 and cathode 38 of the gas tube GT2, a source of bias voltage being included in the circuit. This source of bias voltage provided for tube GT2 comprises a potentiometer consisting of resistors 58 and 39 in series, connected across the power source. The cathode 38 of the tube GT2 is connected to the junction terminal of resistors 58 and 39 through a resistor 40 and the low potential end of the resistor 39 is connected to ground and to one terminal of secondary winding 36, the other terminal of which winding is connected to the control grid 37. Consequently, the cathode 38 is positive in potential with respect to the control grid 37 by the voltage drop across the resistor 39. The anode circuit provided for tube GT2 extends from the positive terminal B of the power source through front contact 29 of relay TR, line wire 30, push button 31, line wire 32, winding of relay R2, anode 41 and tube space to cathode 38 of the tube and the resistors 40 and 39 to ground. The parts are so proportioned that the voltage applied to anode 41 and cathode 38 is ineffective to fire the tube due to the negative bias provided for the control grid 37, but that the positive half cycles of the alternating voltage created in secondary winding 36 of transformer T6 when a 50 kc. alternating voltage of sufficient magnitude is applied to the input of the amplifier AM2, drives the grid 37 in the positive direction and the tube is fired and the relay R2 is energized and picked up due to the conduction current of the tube.

It is to be seen from the foregoing description of the tuned circuits of the wayside apparatus that normally the two tubes GT1 and GT2 are nonconductive and the corresponding relays R1 and R2 are deenergized and released. When an alternating voltage of 70 kc. is made to appear at the output terminals of the bridge and applied to the input of the tuned circuit including amplifier AM1, the tube GT1 is fired and the relay R1 is energized and picked up. Likewise when an alternating voltage of a given magnitude of 50 kc. is applied to the input of the second tuned circuit, the tube GT2 is fired and the relay R2 is picked up.

The two relays R1 and R2 govern destination indicators D1 and D2 located at the wayside station ST. These indicators would be constructed to provide indications that would be distinctive and readily understood by passengers waiting at the station ST. For example, the indicators may be lamps placed back of signs giving names corresponding to the two different train destinations. For the sake of simplicity these indicators are shown as lamps. The lamp D1 is included in a circuit that extends from terminal B of the power source over front contact 42 of relay R1 at the reporting point, line wire 43, and lamp D1 to ground. Likewise the lamp D2 is included in a circuit that extends from terminal B of the power source through front contact 44 of relay R2, line wire 45, and lamp D2 to ground.

The train TN is provided with a controlling means in the form of a coil VC tuned to resonance at a frequency preselected according to the destination of the train. When there are two destinations either of which the train may take, as is the case in Fig. 1, the coil VC is made tunable either to a first or second frequency. To agree with the frequencies assumed for the wayside apparatus at the reporting point RP the coil VC is tuned to resonance at the frequency 70 kc. when the train is scheduled for the first destination and is tuned to resonance at 50 kc. when the train is scheduled for the second destination. To obtain this tuning for the coil VC the two capacitors 46 and 48 are provided on the train together with a manually operable switch 47. The arrangement is such that when the switch 47 is set at the position indicated by the full line in Fig. 1, the capacitor 46 is connected to the coil VC and the coil is tuned to resonance at 70 kc. When the switch 47 is set at the position indicated by the dotted line in Fig. 1, the capacitor 48 is connected to the coil VC and the coil is tuned to resonance at 50 kc.

The train coil VC may consist of one or more turns and is mounted on the train so that it would pass the wayside coil in an inductive relationship therewith when the train TN passes the reporting point RP.

Accordingly, the impedance of the wayside coil is affected when the train-carried element is moved through a zone of influence with respect to the trackway element.

In describing the operation of the apparatus of Fig. 1, I shall assume that the train TN is scheduled for the first destination and the coil VC is tuned to resonance at 70 kc. When the train TN passes the reporting point RP and the coil VC passes the wayside coil TC, the train coil causes an increase in the impedance of the wayside coil for the 70 kc. energy, due to the electrical coupling between the coils. This increase in impedance for the 70 kc. energy in the wayside coil unbalances the bridge WB as far as this frequency is concerned and consequently an alternating voltage of 70 kc. appears at the output terminals 12 and 13 of the bridge, the bridge remaining balanced for the 50 kc. oscillator. This alternating voltage of 70 kc. appearing at the output terminals 12 and 13 is passed by the first tuned circuit due to its being tuned at the corresponding frequency and consequently the tube GT1 is fired and the relay R1 picked up to complete the circuit for the destination indicated D1 at the station ST. Thus there is indicated at the station ST the destination of the train next to arrive at the station. When the train TN subsequently leaves the station ST and proceeds to its destination, the track relay TR is shunted and released due to the train occupying the track circuit adjacent the track switch TS. The release of relay TR opening front contact 29 removes power from the anode circuit of the tube GT1 and the tube is deionized and restored to its non-conductive condition. An operator at the wayside station ST by operating the push button 31 to open the line circuit by which the tube GT1 is powered can also deionize the tube GT1 to restore it to its nonconductive condition.

When the train TN is scheduled for the second destination, its controller 47 is set to connect capacitor 48 to the coil VC and tune the coil to resonance at 50 kc. which has been assigned to the second destination. This time the train coil VC will cause an increase in the impedance of the wayside coil for the 50 kc. energy flowing therethrough when the train passes the reporting point and the bridge is unbalanced for 50 kc. but remains balanced for 70 kc. The 50 kc. alternating voltage appearing at the output terminals 12 and 13 of the bridge is effective to excite the second tuned circuit with the result the tube GT2 is fired and relay R2 is picked up to complete the line circuit for energizing the indicator lamp D2 and there is displayed at the station an indication that the train about to arrive at the station is scheduled for the second destination.

It is apparent that if there are additional destinations for the trains the wayside apparatus at the reporting point RP can be provided with additional oscillators and additional tuned circuits. Each of these additional oscillators and tuned circuits will be proportioned to use frequencies which are assigned to the additional destinations. Each additional tuned circuit at the reporting point would in turn control additional destination indicators at the wayside station. When there are additional destinations for the trains, then the trains would be provided with additional capacitors and additional positions for the switch 47 so that the coil VC can be tuned to resonance at the frequency assigned to the additional destination.

In place of providing a single train coil made tunable to the different destinations, a plurality of train coils can be provided each permanently tuned to a given destination frequency. In this case, the coils would preferably be arranged so that they can be attached to a train like a marker, and while the train is being made ready for a run the proper destination coil would be attached to the train.

In Fig. 2, the apparatus is similar to that shown in Fig. 1 except the apparatus of Fig. 2 is modified to include a single oscillator OSC3 the output energy of which has a square wave form. The oscillator OSC3 of Fig. 2 is shown conventionally since it may be any one of the several known constructions of electron tube oscillators the energy output of which has a square wave. The output of the oscillator OSC3 is connected across the input terminals 10 and 11 of the bridge. Normally a zero or null voltage is developed at the output terminals 12 and 13 of the bridge due to the balanced condition of the bridge and the nature of its construction.

It is known that a square wave has a composition showing odd harmonics of the fundamental frequency. Also that these harmonic frequencies can be separated by applying the wave to circuits each of which is tuned to resonance at an individual harmonic frequency.

In Fig. 2, the first one of the two tuned circuits at the reporting point RP includes an amplifier Af3 having circuits tuned to resonance at the third harmonic frequency of the wave supplied by the oscillator OSC3. That is, the first tuned circuit passes the third harmonic frequency of the fundamental frequency supplied by the oscillator OSC3. The second tuned circuit for the wayside apparatus includes an amplifier Af5 having circuits tuned to resonance at the fifth harmonic of the fundamental frequency of the oscillator OSC3.

In Fig. 2 the train-carried coil VC is shown as being in the form previously described which is permanently tuned to resonance at the frequency corresponding to the destination and which frequency is the third harmonic passed by the first tuned circuit of the wayside apparatus at the reporting point RP when the train is scheduled for the first destination. If the train is scheduled for the second destination, the train coil will be tuned to resonance at the frequency corresponding to the fifth harmonic for which the second tuned circuit of the wayside apparatus is tuned.

It is to be seen, therefore, that in Fig. 2 when the train coil VC of a train scheduled for the first destination passes the wayside coil TC at the reporting point RP the bridge is unbalanced for the third harmonic frequency of the wave supplied by the oscillator OSC3 and a corresponding alternating voltage appears at the output terminals of the bridge. This alternating voltage is passed by the first tuned circuit so that the tube GT1 is fired and the relay R1 is picked up causing the indicator D1 to be displayed at the wayside station ST. Similarly when the train coil VC of a train scheduled for a second destination passes the wayside coil TC the bridge is unbalanced for the fifth harmonic of the wave of the oscillator OSC3 and the alternating voltage appearing at the output of the bridge is passed by the second tuned circuit of the wayside apparatus causing the tube GT2 to be fired and relay R2 to be picked up with the result the indicator lamp D2 at the station ST is displayed to indicate that the train approaching is scheduled for the second destination.

Fig. 3 shows a modification of the apparatus shown in Fig. 1 as previously described. This modification comprises the addition of means for preventing false operation of the apparatus, as a result of the unbalancing of the bridge caused by eddy currents induced in metal objects in proximity to the bridge.

When a relatively large metal object such as the side or floor of a subway car approaches the wayside coil, the magnetic field produced by the coil induces eddy currents in the metal, resulting in the consumption of energy with substantially the same effect as if the coil TC were shunted by a resistance load connected directly across terminals 10 and 13. That is to say, the effect of the eddy currents is to cause a decrease in the apparent impedance of the wayside coil. As a result, the bridge is unbalanced and an unbalance voltage appears across the output terminals of the bridge, and since each of the voltages supplied to the coil is capable of inducing eddy currents, this voltage will contain components having each of the frequencies supplied to the bridge.

Accordingly, it will be seen that if the bridge arrangement as shown in Figs. 1 and 2 and described in connection therewith is adjusted for high sensitivity so as to respond to a relatively small amount of unbalance, it may be subject to false operation due to the passage of large metal objects near the wayside coil. This erroneous operation may be avoided by decreasing the sensitivity of the apparatus to the point where only the unbalance produced by a tuned coil causes the apparatus to operate, but such an adjustment also reduces the maximum prescribed distance between the wayside coil and the vehicle-carried coil at which the apparatus will definitely and reliably respond, making it necessary to use larger coils than would otherwise be necessary.

It will be seen that when the coils TC and VC are in proximity they are equivalent to a transformer having a tuned secondary. At the resonant frequency therefore, the effect is substantially the same as if the coil TC were tuned to anti-resonance by a condenser connected across terminals 10 and 13, resulting in an increase in the apparent impedance of coil TC at that frequency, but with a negligible effect at other frequencies.

It is well known that the relative instantaneous polarity of the voltage which appears at the output terminals of an alternating current bridge when the bridge is unbalanced due to an increase in the impedance of one arm is reversed with respect to that of the voltage which appears due to the unbalancing of the bridge by a decrease in the impedance of that arm, the input voltage being used as a reference in both cases.

A feature of my invention is the utilization of this phase difference, or shift in the relative polarity of the output voltage, to determine if the bridge has been unbalanced by a tuned vehicle-carried coil or if the unbalance is due to the presence of a nearby metal object. I accomplish this result by comparing the phase of the output voltage of the bridge with the phase of the input voltage, at each frequency employed, and arranging the apparatus to be responsive when and only when the phase difference is that produced by the unbalancing of the bridge by a tuned coil.

Referring to Fig. 3 of the drawings, there is shown a modification of the equipment shown in Fig. 1 and described in connection therewith. Only that portion of the apparatus necessary to understand this modification of my invention is shown in Fig. 3, and the remainder may be arranged as shown in Fig. 1. The modification comprises the addition of phase detecting means, one for each frequency impressed on the bridge, which phase detecting means is arranged so that the associated gas tube is fired and the relay controlled thereby is picked up when and only when the voltage at a particular frequency supplied thereto from the output terminals of the bridge is in phase with a reference voltage supplied at the same frequency from the oscillator which supplies energy to the input terminals of the bridge. It is to be understood that my invention is not limited to the particular phase detector or discriminator shown in Fig. 3, but any one of several well-known arrangements may be employed.

The bridge WB is supplied with energy from the oscillators OSC1 and OSC2 in the same manner as shown in Fig. 1 and described in connection therewith. Also the output terminals of the bridge are connected to the amplifiers AM1 and AM2 which are selective to the frequencies of oscillators OSC1 and OSC2, as in Fig. 1. The output of each of the amplifiers is supplied to a phase discriminator circuit, one for each amplifier or frequency employed, and the output of the phase discriminator is supplied to the grid of the associated gas tube which governs a relay in a manner similar to that shown in Fig. 1 and described in connection therewith. Considering the circuits associated with relay R1, for example, the output of the oscillator OSC1 is connected through filter 17 to the coupling transformer T1 to supply energy at the first frequency, say 70 kc. for example, to the input terminals 10 and 11 of bridge WB. Additionally, the primary winding 60 of a mixing transformer T7 is supplied with 70 kc. energy from the oscillator OSC1. The output terminals 12 and 13 of the bridge are connected to the input of the amplifier AM1 through a transformer T3 tuned to 70 kc., and the output of amplifier AM1 is supplied to the primary winding 22 of a tuned output transformer T5. The secondary winding 23 of transformer T5 is connected through a coupling condenser 62 to a center tap 64 of a secondary winding 66 of transformer T7. A resistor 68 connects the center tap 64 of the secondary winding 66 to ground for purposes to be subsequently explained. Two resistors 70 and 72, of equal value connected in series, have their end terminals connected to the end terminals of the secondary winding 66 of transformer T7, with an asymmetric unit K1 or K2 interposed in each connection as shown. These units may be vacuum tube diodes, crystal type diodes, dry disc rectifiers or other suitable devices which have a relatively high resistance to current flowing in one direction and a relatively low resistance to current flowing in the other direction.

The junction 74 of resistors 70 and 72 is connected to the grid 24 of gas tube GT1 and to one terminal of a capacitor 76, the other terminal of capacitor 76 being connected to ground.

The apparatus associated with the second relay R2 is similar to that described above for relay R1 and amplifier AM1, with the exception that the amplifier AM2 is tuned for the second frequency, for example, 50 kc., and the primary winding of the mixing transformer T8 is connected to the output of oscillator OSC2 to supply energy of the second frequency to the primary winding of the mixing transformer.

The operation of the modification of my invention shown in Fig. 3 will now be described with reference to the apparatus associated with relay R1 under different conditions, the action being similar for the apparatus associated with relay R2.

Normally, the bridge WB is balanced and the output of the amplifier AM1 is zero or negligible.

The reference voltage supplied to the primary winding of the mixer transformer T7 induces a voltage at the same frequency in the secondary winding of the transformer. During one half cycle of the voltage in the secondary winding, the polarity is such that the asymmetric devices conduct the current, and during the other half cycles the asymmetric devices conduct but little or none at all. The voltage drops around the loop formed by the secondary winding 66 of the mixer transformer, the asymmetric devices K1 and K2, and the series resistors 70 and 72 add to zero, and consequently the center tap 64 of the transformer secondary winding and the junction point 74 of the resistors are at the same potential. The center tap 64 of the transformer secondary winding is connected to ground through the resistor 68, and since there is little or no current being supplied from the output of amplifier AM1, there is no voltage drop across resistor 68, so that the center tap 64, the junction point 74, and consequently the grid 24 of tube GT1 are effectively grounded at this time. The cathode 25 of tube GT1 is at some potential positive with respect to ground, as supplied by the voltage divider comprising resistors 27 and 28 connected between terminal B of the direct current source and ground. Accordingly, the cathode 25 of tube GT1 is at some positive potential with respect to the grid 24 of the tube, and the tube will not conduct at this time.

It will be seen from the foregoing that under normal conditions with the bridge WB at balance, the tube GT1 remains nonconducting and relay R1 remains released.

It will now be assumed that a vehicle-carried coil tuned to its first frequency passes the wayside coil TC, and as a result the bridge is unbalanced for the first frequency to which the amplifier AM1 and the filter 17 are tuned, for example, 70 kc.

As previously pointed out, the apparent impedance of the wayside coil is increased by the passage of the tuned coil, so that the unbalance voltage appearing at the output terminals of the bridge will have a particular phase with respect to the input voltage. The unbalance voltage is amplified by the amplifier AM1 and the output voltage of the amplifier appears across the resistor 68. This voltage will also have a certain phase relationship with respect to the reference voltage induced in the secondary winding 66 of transformer T7. The parts are constructed and arranged so that the signal voltage appearing across the resistor 68 when the bridge WB is unbalanced by a tuned coil is substantially in phase with the reference voltage induced in the secondary winding 66 of transformer T7. The parts are selected and arranged so that at this time the signal voltage is positive with respect to ground at the same instant of time that the reference voltage is of the polarity for which the asymmetric units are conductive. That is, the reference voltage and the signal voltage have a polarity or phase relationship such that the current due to the reference voltage flows from left to right through rectifier K1 and right to left through rectifier K2 on the half cycles in which the signal voltage is of the proper polarity to cause current to flow through rectifier K1. On these half cycles, the two currents add, and charge the condenser 76 so that its upper plate is positive with respect to its lower, or grounded plate. Accordingly, the succeeding half cycles of the signal voltage and the reference voltage, having polarities as described above, will cause a voltage to be built up on condenser 76, with a polarity such that the upper plate is positive with respect to ground. During the other half cycles of the reference and signal voltages, the charge on the condenser 76 is prevented from leaking off, since rectifier K1 is poled in the opposite direction required for energy to flow from the condenser 76, and the polarity of the reference voltage is such that it opposes any current flow from the condenser through rectifier K2. When the positive voltage of the condenser 76 exceeds the value of the negative bias voltage on the grid 24, the tube GT1 is rendered conductive and the flow of current through the plate circuit of the tube picks up relay R1, the contacts of which may control indicating circuits as shown in Fig. 1.

When the bridge is unbalanced for the second frequency, the operation of the apparatus associated with relay R2 is similar to that described above for the first frequency, and hence it is not necessary to describe this operation in detail.

From the foregoing, it will be seen that the apparatus comprising my invention as shown in Fig. 3 is arranged so that the unbalancing of the bridge by a tuned vehicle-carried coil results in the operation of the equipment to indicate the passage of the vehicle carrying the coil, thereby selectively indicating the route of the vehicle by the response of the wayside apparatus to the particular frequency to which the vehicle-carried coil is resonant.

It will now be assumed that a large metal object approaches the wayside coil TC, such as might be occasioned by the passage of a vehicle with metal sides or floor. The magnetic field produced by the flow of energy in the wayside coil TC causes eddy currents to be set up in the metal, which in turn cause a reduction in the apparent impedance of the wayside coil. Accordingly, the bridge is unbalanced, but the relative instantaneous polarity of the unbalance voltage across the output terminals of the bridge is reversed with respect to that produced by a tuned coil unbalancing the bridge.

It is to be noted that, when unbalance is due to the eddy current effect, the output voltage will contain each of the frequencies of the input voltage, since the action is not selective with respect to frequency. With the arrangement shown in Fig. 3, the unbalance voltage will appear at the input terminals of the amplifiers AM1 and AM2 at both the first and the second frequencies, and the amplifiers will accordingly both respond and supply an amplified voltage at each frequency to their respective phase detector circuits.

The detailed operation of the apparatus associated with relay R1 will be described, the operation of the apparatus associated with relay R2 being similar.

At this time, the reference voltage induced in the secondary winding 66 of transformer T7 is of the opposite polarity with respect to the signal voltage appearing across resistor 68. That is, during the half cycles in which the polarity of the signal voltage is such as to cause current to flow through rectifier K1 from left to right, the reference voltage in secondary winding 66 is such as to oppose the signal voltage, so that the condenser 76 does not receive the positive charging impulses as previously described. During the other half cycles, in which the reference voltage is of the polarity such that it will flow through the rectifier K1 and K2, the polarity of the signal voltage is such that current will flow from the grounded terminal of resistor 68, through condenser 76 and through rectifier K2 from right to left. Accordingly, the flow of current is such that the succeeding half cycles of reference and signal voltage cause the upper plate of condenser 76 to become negatively charged with respect to its lower, or grounded plate. During the half cycles in which the condenser 76 is not being charged, the rectifier K2 prevents the flow of energy from the grounded plate to the upper plate of condenser 76, and the reference voltage opposes any flow of energy through rectifier K1. As a result, a negative voltage is built up in condenser 76. Since the grid of tube 24 is thus driven more in the negative direction, the tube GT1 cannot fire and pick up relay R1. In similar manner, the tube GT2 will be prevented from firing and picking up relay R2.

It will be apparent therefore, that with the apparatus comprising my invention as shown in Fig. 3, the unbalancing of the bridge by the influence of eddy currents on the wayside coil is prevented from causing false operation of the indication relays and associated apparatus.

An additional advantage resulting from the provision of the phase detector circuit as shown in Fig. 3 is that a short time delay in the firing of tube GT1 is provided by requiring a positive charge to be built up on condenser 76 until a voltage is acquired sufficient to overcome the negative bias voltage on the grid of the gas tube. Thus, momentary surges in the voltage supplied to the tube, or momentary induced surges in the wayside coil TC will not cause the erroneous operation of the indication relays. The condenser 76 is selected so that the energy supplied thereto as the result of a momentary surge will be insufficient to charge the condenser to the firing point of the tube, but the energy supplied thereto during the period in which the wayside coil is unbalanced by a tuned vehicle-carried coil passing at the highest speed encountered will be sufficient to fire the tube.

Although I have herein shown and described only certain forms of vehicle reporting systems embodying my invention, it is to be understood that various changes and modifications may be made therein within the scope of the appended claims without departing from the spirit and scope of my invention.

Having thus described my invention, what I claim is:

1. In a vehicle reporting system, the combination comprising, a wayside receiving element having electrical impedance, a bridge circuit having a first and a second path in parallel each divided into two arms with the junctions of said parallel paths forming input terminals and the junctions of the arms of the paths forming output terminals, said receiving element forming the first arm of the first path, an impedance element constructed to have an impedance which bears a fixed ratio to that of said wayside receiving element, said impedance element forming the first arm of the second path, two other impedance elements having the same impedance ratio as that of said two elements, one of which forms the second arm of said first path and the other the second arm of said second path, generating means for supplying alternating current energy having a plurality of different frequency components to said bridge circuit input terminals, a plurality of tuned circuits, one tuned to the frequency of each of said components, connected in multiple across said bridge circuit output terminals, a plurality of indicators including one controllable by each of said tuned circuits, in response to a change in the apparent impedance of said receiving circuit element, and electrical controlling means located on vehicles passing said receiving element for changing said apparent impedance, comprising impedance elements each tuned to resonance at the frequency of one or another of said energy components and movable into an inductive relationship with said wayside receiving element.

2. In a vehicle reporting system, the combination comprising, a stationary receiving circuit element having electrical impedance, three fixed impedances, a bridge circuit having four arms comprising said receiving element and said fixed impedances connected to form a square and so proportioned that the product of the impedances of two diagonally opposite arms equals the product of the impedances of the other two arms, two diagonally opposite corners of said square forming input terminals and the other two corners forming output terminals, generating means for supplying alternating current energy having a plurality of different frequency components to said input terminals, a plurality of tuned circuits connected in multiple across said output terminals, each of said tuned circuits being tuned to resonance at a different one of said plurality of frequencies, signaling means operable to display different indications and selectively controllable by said tuned circuits in response to a change in the apparent impedance of said receiving circuit element, and electrical controlling means for changing the apparent impedance of said circuit means comprising impedance elements each tuned to resonance at a selected one of said plurality of different frequencies and movable at times into an inductive relationship with said stationary receiving circuit element.

3. In combination, a bridge circuit comprising two parallel paths of two arms each; a first one of the arms of each of said paths consisting of a non-tuned coil, the two coils being so constructed that their impedances vary in such manner with frequency that their impedance ratio remains constant, a second one of the arms of each of said paths consisting of an impedance element, the two impedance elements being so constructed that their impedance ratio is the same as that of said coils at all frequencies, said bridge being normally balanced and non-tuned, generating means for supplying alternating current energy having a plurality of different frequency components to the junctions of the two paths of said bridge, said generating means causing substantially no voltage to normally appear across the junctions of the two arms of said paths due to the construction of the arms of the bridge and its non-tuned condition, a plurality of tuned circuits in multiple connected across said junctions of the two arms of said paths to detect voltage appearing across these junctions, said tuned circuits being tuned to resonance one at each of the frequencies of said energy, signaling circuits one governed by each of said tuned circuits, a control circuit element tunable to resonance at any selected one of said plurality of frequencies, said control circuit element being movable into position to cooperate with a given one of said coils to cause a voltage having the frequency corresponding to that at which said controlling circuit element is tuned to appear at said junctions of the two arms of said paths for exciting the corresponding tuned circuit and governing the corresponding signaling circuit.

4. In combination, a bridge circuit comprising two parallel paths of two arms each, a first one of the arms of each of said paths consisting of a non-tuned coil, the two coils being constructed to have a constant impedance ratio, a second one of the arms of each of said paths consisting of an impedance element, the two impedance elements being constructed to have the same impedance ratio as said coils irrespective of variations of frequency, generating means for supplying alternating current energy made up of a plurality of different frequency components, said generating means being connected across the junctions of said parallel paths, but normally causing no voltage to appear across the junctions of the two arms of said paths due to the balanced construction of the arms of said bridge, a plurality of tuned circuits connected in multiple across said junctions of the two arms of said paths, said circuits being excited when voltage appears across these junctions, said tuned circuits being tuned to resonance one at each of the frequency components of said energy, signaling circuits one governed by each of said tuned circuits when excited, control means including a coil tuned to resonance at the frequency of any selected one of said frequency components, and means for moving said coil at times into an electrical influencing position with respect to a given one of said bridge coils for unbalancing said bridge by changing the apparent impedance of such bridge coil at the frequency at which said circuit means is tuned, the bridge remaining balanced for all the other of said frequencies.

5. In a vehicle reporting system, a bridge circuit having two parallel paths each having two arms, the junctions of said paths forming input terminals and the junctions of the arms of the two paths forming output terminals for the bridge, a first one of the arms of each of said paths consisting of a coil, said coils being non-tuned and constructed to have an impedance ratio of which remains constant with variations of frequency, a given one of said coils being positioned for receiving electrical influences, a second one of the arms of each of said paths consisting of a resistor, said two resistors having the same impedance ratio as said coils, said bridge being non-tuned and balanced for all frequencies over a given frequency range due to the construction of its arms, an oscillator operable to supply alternating current energy having at least a first and a second prominent harmonic frequency within said frequency range, said oscillator being connected across said input terminals, a pair of tuned circuits one tuned to resonance at each of said harmonic frequencies, said tuned circuits being connected in multiple across said output terminals, two indicators, one connected to each of said tuned circuits, a control circuit means including a coil and a tuning element for tuning the control circuit means to resonance at either one of said harmonic frequencies, and means for moving said coil of said control circuit means at times into a zone of electrical influence with respect to said given one of the coils of said bridge.

6. In a vehicle reporting system, an indicator located along a track and operable to different conditions for indicating the destination of an approaching train, a plurality of tuned circuits one for each destination the train may take and each tuned to resonance at an individual frequency and including a relay which is energized when the circuit is energized, said relays being operable to control the condition of the indicator means according to which relay is energized, a bridge circuit having two parallel paths of two arms each, the junctions of said paths forming input terminals and the junctions of the arms of the paths forming output terminals, a wayside coil and another coil, said trackway coil forming a first one of the arms of a first one of said paths and said another coil forming a first one of the arms of the second one of the paths, said two coils having an impedance ratio which remains constant with variations of frequency, two resistors one forming the second one of the arms of said first path and the other forming the second one of the arms of said second path, said resistors having the same impedance ratio as said coils, generating means operable to supply alternating current energy having a plurality of different frequency components one for each of said tuned circuits, said generating means being connected across said input terminals, said tuned circuits being connected in multiple across said output terminals, a vehicle carried destination marker including a coil tuned to resonance at a frequency selected according to the destination of the vehicle, and so located on said vehicle as to pass in proximity to said wayside coil when the train approaches said station, said vehicle-carried coil being effective to unbalance said bridge at the frequency at which the vehicle-carried coil is tuned sufficiently to energize the corresponding tuned circuit and thereby cause said indication means to indicate the corresponding condition.

7. In a system for reporting the passage of vehicles having different destinations, which vehicles traverse a common route for a portion of their travel, in combination, a vehicle-carried coil mounted on each of said vehicles and capable of being tuned to electrical resonance for a plurality of frequencies in a predetermined frequency range, each frequency corresponding to a particular destination, a wayside coil located at a point along the common route of said vehicles, said wayside coil being constructed and arranged to be in inductive relationship with said vehicle-carried coils which pass said wayside coil to thereby vary the impedance of the wayside coil, a bridge circuit comprising a network in the form of a square having four arms and four junction points, said wayside coil comprising one of said arms, the other arms comprising impedance elements and arranged so that the product of the impedances of one pair of opposite arms is normally equal to the product of the impedances of the other pair of opposite arms for all frequencies in said predetermined range, generating means for supplying alternating current energy having a plurality of frequency components within said predetermined range corresponding to the different resonant frequencies of said vehicle-carried coils to a pair of diagonally opposite junction points of said bridge circuit, a plurality of tuned circuits connected in multiple across the other pair of diagonally opposite junction points of said bridge circuit to thereby provide a tuned circuit for each of the resonant frequencies of the vehicle-carried coils, and signaling circuits governed by each of said tuned circuits.

8. In combination with a normally balanced bridge circuit having input and output terminals, a source of alternating current normally supplying voltage to said input terminals, means for unbalancing said bridge at times in such manner that the phase of the unbalance voltage is shifted in a given direction with respect to that of the voltage supplied to the bridge, means for unbalancing said bridge at other times in such manner that the phase of the unbalance voltage is shifted in the opposite direction with respect to that of the voltage supplied to the bridge, a phase discriminator for comparing the phase of the unbalance voltage with that of the voltage supplied to the bridge, unbalance detecting means governed by said phase discriminator and rendered operative when and only when the phase of the unbalance voltage is shifted in said given direction with respect to the phase of the voltage supplied to said bridge.

9. In a vehicle reporting system, the combination comprising, a stationary non-tuned receiving circuit means, three non-tuned impedance elements, a bridge circuit having four arms comprising said receiving circuit means and said pedances of two diagonally opposite arms equals and so proportioned that the product of the impedances of two diagonally opposite arms equals the product of the impedances of the other two arms through a predetermined range in frequencies supplied to the bridge circuit, opposite corners of said square forming input terminals and the other two corners forming output terminals, said bridge circuit being non-tuned, generating means operable to supply alternating current energy of a given frequency connected across said input terminals, a tuned circuit tuned to resonance at said given frequency and connected across said output terminals, an indicator controlled by said tuned circuit, control means comprising an impedance element tuned to resonance at said given frequency, means for at times moving said control means into a given position with respect to said receiving circuit means to thereby unbalance the bridge, the parts being constructed and arranged so that the unbalance voltage produced by the effect of said control means has a particular phase relationship with respect to the voltage supplied to the input terminals of said bridge, and means for determining if the bridge circuit is unbalanced as a result of the influence of said control circuit means or is unbalanced as a result of other conditions, said means comprising a phase discriminator for determining the relative phase between the unbalance voltage at the output terminals of the bridge and that of the voltage supplied to the input terminals of the bridge, and means governed by said phase discriminator for rendering said tuned circuit incapable of controlling said indicator unless said phase relationship corresponds to that produced by the effect of said control means.

10. In a vehicle reporting system, in combination, a bridge circuit having four arms comprising four impedance elements arranged in the form of a square with input terminals at two diagonally opposite corners and output terminals at the other two corners, said impedance elements being constructed and arranged so that the product of the impedances of one pair of diagonally opposite arms is normally equal to the product of the impedances of the other two arms for frequencies within a predetermined range, generating means for supplying alternating current energy having a plurality of frequencies within said predetermined range to the input terminals of said bridge circuit, a plurality of tuned circuits connected in multiple across the output terminals of said bridge circuit, each of said tuned circuits being tuned to resonance for a different one of the frequencies supplied to said bridge, indication means governed by said tuned circuits, means for selectively unbalancing said bridge circuit to indicate the passage of a vehicle, said means comprising one of said impedance elements disposed in proximity to the path of the vehicle and a cooperating vehicle-carried element capable of being tuned to electrical resonance at any one of said frequencies to correspond to the destination of said vehicle, said vehicle-carried element being disposed to influence said one impedance element to change its apparent impedance for the frequency at which the vehicle-carried element is resonant, and thereby unbalance said bridge circuit for one of said frequencies impressed thereon in such a direction that the phase of the unbalance voltage has a predetermined phase relationship with respect to that of the voltage supplied to the bridge, phase discriminator means for determining the phase relationship of the unbalance voltage with respect to the phase of the voltage supplied to the bridge, and means governed by said phase discriminator means for rendering said tuned circuits capable of governing said indication means when the bridge is unbalanced in the direction to produce said predetermined phase relationship and to render said tuned circuits incapable of governing said indication means when the bridge is unbalanced in the opposite direction.

11. In combination, a receiving coil, an alternating current bridge circuit having four impedance elements connected in the form of a square, one of said four elements comprising said receiving coil, said bridge circuit being balanced at a given frequency, a generator of energy of said given frequency connected across a selected pair of diagonally opposite corners of said square, a receiving circuit including an amplifier tuned to resonance at said given frequency and connected across the other two corners of said square, control circuit means tuned to resonance at said given frequency, means for moving said control circuit means into inductive relation with said receiving coil to unbalance said bridge circuit and create a voltage which is applied to said receiving circuit, said voltage having a predetermined phase relation with respect to that of the voltage supplied by said generator, a phase discriminator circuit network having an input winding coupled to said generator and to the output of said amplifier and an output capacitor which is so connected to the input winding through a resistance and a pair of rectifiers that it becomes charged by rectified voltage having a relative polarity determined by the phase relation between the generator voltage and that of the output of the amplifier, a gas tube having an anode, a cathode and a control grid; an anode-cathode circuit for said tube normally ineffective to fire the tube, said control grid being so connected to said capacitor that the grid is driven positive with respect to the cathode and the tube is fired when and only when the bridge circuti voltage has said predetermined phase relation with respect to said generator voltage and a signal means controlled by said anode-cathode circuit.

12. In combination, a receiving coil, an alternating current bridge circuit having four impedance elements connected in the form of a square, one of said four elements comprising said receiving coil, said bridge circuit being balanced at a given frequency, a generator of energy of said given frequency connected across a selected pair of diagonally opposite corners of said square, receiving circuit including an amplifier tuned to resonance at said given frequency and connected across the other two corners of said square, control circuit means tuned to resonance at said given frequency, means for moving said control circuit means into inductive relation with said receiving coil to unbalance said bridge circuit and create a voltage which is applied to said receiving circuit, said voltage having a predetermined phase relation with respect to that of the voltage supplied by said generator, a phase discriminator circuit network having an input winding coupled to said generator and to the output of said amplifier and an output capacitor which is so connected to the input winding through a resistance and a pair of rectifiers that it becomes charged by rectified voltage having a relative polarity determined by the phase relation between the generator voltage and that of the output of the amplifier; and signal circuit means coupled to said capacitor and effectively energized when and only when the capacitor charge is of the polarity corresponding to that created when said bridge circuit voltage has said predetermined phase relation with respect to said generator voltage.

13. In a vehicle reporting system, a wayside source of energy of a given frequency, a vehicle-carried coil tuned to resonance at said given frequency, a wayside coil disposed to be inductively influenced in one manner by the passage of said vehicle-carried coil, and to be inductively influenced in another manner by the presence of metallic objects other than said vehicle-carried coil in the vicinity of said wayside coil, a normally inactive wayside receiver means tuned to said given frequency and connected to said wayside coil, said receiver means rendered active by energy supplied from said wayside source when said wayside coil is inductively influenced by the passage of a vehicle-carried coil or a metallic object other than said vehicle-carried coil, an indicating means connected to said receiver means, and discriminator means connected to said receiver means and effective to enable the receiver means to actuate said indicating means when and only when said wayside coil is inductively influenced in said one manner.

14. In a vehicle reporting system, in combination, a vehicle-carried coil tuned to resonance at a given frequency, a wayside coil disposed to be inductively influenced in one manner when said vehicle-carried coil is in the vicinity of said wayside coil and to be inductively influenced in another manner by the presence of metallic objects other than said vehicle-carried coil in the vicinity of said wayside coil, a source of alternating current energy having the same frequency as said given frequency, a tuned circuit resonant at said given frequency, coupling means associated with said wayside coil for supplying energy from said source to said tuned circuit when said wayside coil is inductively influenced by the presence of said vehicle-carried coil or another metallic object in the vicinity of said wayside coil, the energy supplied to said tuned circuit having a first phase relationship to the voltage of said source when said wayside coil is influenced in said one manner and having a second phase relationship to the voltage of said source when said wayside coil is influenced in said another manner, discriminator means connected to said source and said tuned circuit for determining the phase relationship of the energy supplied to said tuned circuit, and indicator means governed by said tuned circuit and said discriminator means and actuated when and only when energy having said first phase relationship is supplied to said tuned circuit.

15. In a vehicle reporting system for reporting the passage of vehicles having different destinations, which vehicles traverse a common route for a portion of their travel, in combination, a vehicle-carried coil mounted on each of said vehicles and capable of being tuned to electrical resonance for a plurality of frequencies in a predetermined frequency range, each frequency corresponding to a particular destination, a wayside coil located at a point along the common route of said vehicles, said wayside coil being disposed to be inductively influenced in one manner when one of said vehicle-carried coils is in the vicinity of said wayside coil, and to be inductively influenced in another manner by the presence of metallic objects other than said vehicle-carried coils in the vicinity of said wayside coil, generating means for generating alternating current energy having a plurality of frequency components within said predetermined range corresponding to the different resonant frequencies of said vehicle-carried coils, a plurality of tuned circuits, one for each of the resonant frequencies of said vehicle-carried coils, coupling means associated with said wayside coil for supplying energy from said generating means to said tuned circuits when said wayside coil is inductively influenced by the presence of one of said vehicle-carried coils or is inductively influenced by the presence of metallic objects other than said vehicle-carried coils in the vicinity of said wayside coil, the energy supplied to said tuned circuits having a first phase relationship to the voltage of said source when said wayside coil is inductively influenced in said one manner and having a second phase relationship to the voltage of said source when said wayside coil is inductively influenced in said another manner, discriminator means connected with each of said tuned circuits and said source for determining the phase relationship of the voltage of the energy supplied thereto by said tuned circuit to the voltage of said generating means, and indicator means governed by each of said tuned circuits and said discriminator means and rendered effective when and only when energy having said first phase relationship is supplied from said tuned circuits to said discriminator means.

RICHARD W. TREHARNE, Jr.

References Cited in the file of this patent

UNITED STATES PATENTS

| Number | Name | Date |
| --- | --- | --- |
| 1,512,288 | Howe | Oct. 21, 1924 |
| 1,517,549 | Espenschied | Dec. 2, 1924 |
| 1,708,524 | Tatz | Apr. 9, 1929 |
| 1,797,651 | Gergacsevics et al. | Mar. 24, 1931 |
| 1,870,181 | Mallory | Aug. 2, 1932 |
| 2,122,358 | Preston | June 28, 1938 |
| 2,537,298 | Baughman | Jan. 9, 1951 |
| 2,554,056 | Peter et al. | May 22, 1951 |